US009132716B1

(12) United States Patent
Mauro

(10) Patent No.: US 9,132,716 B1
(45) Date of Patent: Sep. 15, 2015

(54) UNIVERSAL GOLF CART WINDSHIELD ASSEMBLY

(71) Applicant: Ed Mauro, Oldsmar, FL (US)

(72) Inventor: Ed Mauro, Oldsmar, FL (US)

( * ) Notice: Subject to any disclaimer, the term of this patent is extended or adjusted under 35 U.S.C. 154(b) by 0 days.

(21) Appl. No.: 14/288,502

(22) Filed: May 28, 2014

(51) Int. Cl.
*B60J 1/00* (2006.01)
*B60J 1/06* (2006.01)

(52) U.S. Cl.
CPC *B60J 1/007* (2013.01); *B60J 1/006* (2013.01); *B60J 1/06* (2013.01)

(58) Field of Classification Search
CPC ... C08L 29/14; C08L 67/02; Y10T 29/49826; B60S 1/0822; H05B 3/84; B64C 1/1492; B60J 1/06; B60J 5/0487; Y10S 280/05; A63B 2055/082
USPC ............. 296/84.1, 77.1, 96.21, 102, 79; 114/361; 280/DIG. 5, DIG. 6
See application file for complete search history.

(56) References Cited

U.S. PATENT DOCUMENTS

| | | | | |
|---|---|---|---|---|
| 4,773,695 A | * | 9/1988 | Jones et al. | 296/77.1 |
| 5,195,797 A | * | 3/1993 | Hobbs | 296/77.1 |
| 5,385,379 A | * | 1/1995 | Heavner | 296/84.1 |
| 5,385,380 A | * | 1/1995 | Heavner | 296/84.1 |
| 5,975,615 A | * | 11/1999 | Showalter | 296/96.21 |
| 6,206,447 B1 | * | 3/2001 | Nation | 296/77.1 |
| RE38,272 E | * | 10/2003 | Nation | 296/77.1 |
| 6,663,158 B1 | * | 12/2003 | Showalter | 296/96.21 |
| 7,311,347 B1 | * | 12/2007 | Aller | 296/77.1 |
| 8,087,711 B1 | * | 1/2012 | Mauro | 296/89 |
| 2006/0091089 A1 | * | 5/2006 | Christiansen et al. | 211/70.2 |
| 2014/0203588 A1 | * | 7/2014 | Tyrer | 296/79 |

* cited by examiner

*Primary Examiner* — Kiran B Patel
(74) *Attorney, Agent, or Firm* — Matthew G. McKinney; Allen, Dyer, Doppelt, Mibrath & Gilchrist, P.A.

(57) ABSTRACT

A universal golf cart windshield assembly includes a pair of elongated rails and a bracket secured to each rail, where each bracket is configured to clamp over a vertical support member of a golf cart. A longitudinal slot is disposed on each rail and a flange is joined along a longitudinal edge of the longitudinal slot and extends generally at a right angle to the slot. A plurality of apertures are disposed on the flange of each rail. The assembly also includes a lower windshield pane and an upper windshield pane, where opposing edges of the upper windshield pane are slidingly engaged with the respective longitudinal slot of each rail. In addition, the assembly also includes a spring loaded latch secured to the upper windshield pane, where the pin is adapted to engage a desired aperture of the flange to restrain the upper windshield pane in a desired vertical position.

10 Claims, 6 Drawing Sheets

UNIVERSAL GOLF CART WINDSHIELD ASSEMBLY

I. FIELD OF THE DISCLOSURE

The present disclosure is generally related to a universal golf cart windshield assembly.

II. BACKGROUND

Golf carts are motorized vehicles that are most often used by golfers when playing a round of golf. Although golf is generally played in favorable weather conditions, there are instances when additional protection from cold weather, wind or rain is needed to the occupants of the golf cart. The additional protection may be provided through the use of a windshield on the front of the golf cart. Prior art windshields for golf carts have included two panels where the top panel is adapted to open by folding down over the lower panel to provide an open area at the front of the golf cart. However, a shortcoming of the prior art golf cart windshields is the inability to easily and effectively secure the upper panel when in an open position and folded down over the lower panel. Most windshields cannot be opened or closed from inside the golf cart. You must exit the car to open or close the windshield. Current windshields use rubber clips that over time get hard and crack rendering them inoperable. Current windshields typically have a PVC hinge connecting the top and the bottom. These hinges by nature turn yellow obstructing the view from the golf cart.

Other prior art windshields are designed to be completely removed from the golf cart or are required to be stored on the roof portion of the golf cart. Thereby, making such prior art windshields inconvenient and cumbersome to maneuver. None of the prior art golf cart windshields have the ability to be adjusted to provide an opening of variable height or to accommodate various widths and configurations of vertical supports that are used to secure the windshield to the golf cart.

It is, therefore, to the effective resolution of the aforementioned problems and shortcomings of the prior art that the present invention is directed.

However, in view of the prior art at the time the present invention was made, it was not obvious to those of ordinary skill in the pertinent art how the identified needs could be fulfilled.

III. SUMMARY

In a particular embodiment, a universal golf cart windshield assembly is disclosed. In a particular embodiment, the assembly includes a pair of elongated rails and a bracket secured to each rail, where each bracket is configured to clamp over a vertical support member of a golf cart. A longitudinal slot is disposed on each rail and a flange is joined along a longitudinal edge of the longitudinal slot and extends generally at a right angle to the slot. A plurality of apertures are disposed on the flange of each rail. The assembly also includes a lower windshield pane and an upper windshield pane, where opposing edges of the upper windshield pane are slidingly engaged with the respective longitudinal slot of each rail. In addition, the assembly also includes a spring loaded latch secured to the upper windshield pane, where the pin is adapted to engage a desired aperture of the flange to restrain the upper windshield pane in a desired vertical position.

One particular advantage provided by embodiments of the universal golf cart windshield assembly is the ability to vertical adjust the opening in the windshield. This is particularly advantageous to open the windshield to provide additional breeze to the occupants of the golf cart and to easily and conveniently close the opening in cooler or less favorable weather conditions. In addition, the brackets that attach the rails to the golf cart are adjustable to various widths of vertical supports and also can rotate to accommodate various angles of the vertical supports. The upper windshield pane can be raised and lowered to the desired position with only one hand from inside the golf cart. Further, the construction of typical golf cart windshields required the replacement of the entire assembly should the top or bottom pane be damages. In contrast, the universal golf cart windshield assembly is fabricated such that an individual part may be replaced without replacing the entire windshield assembly.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
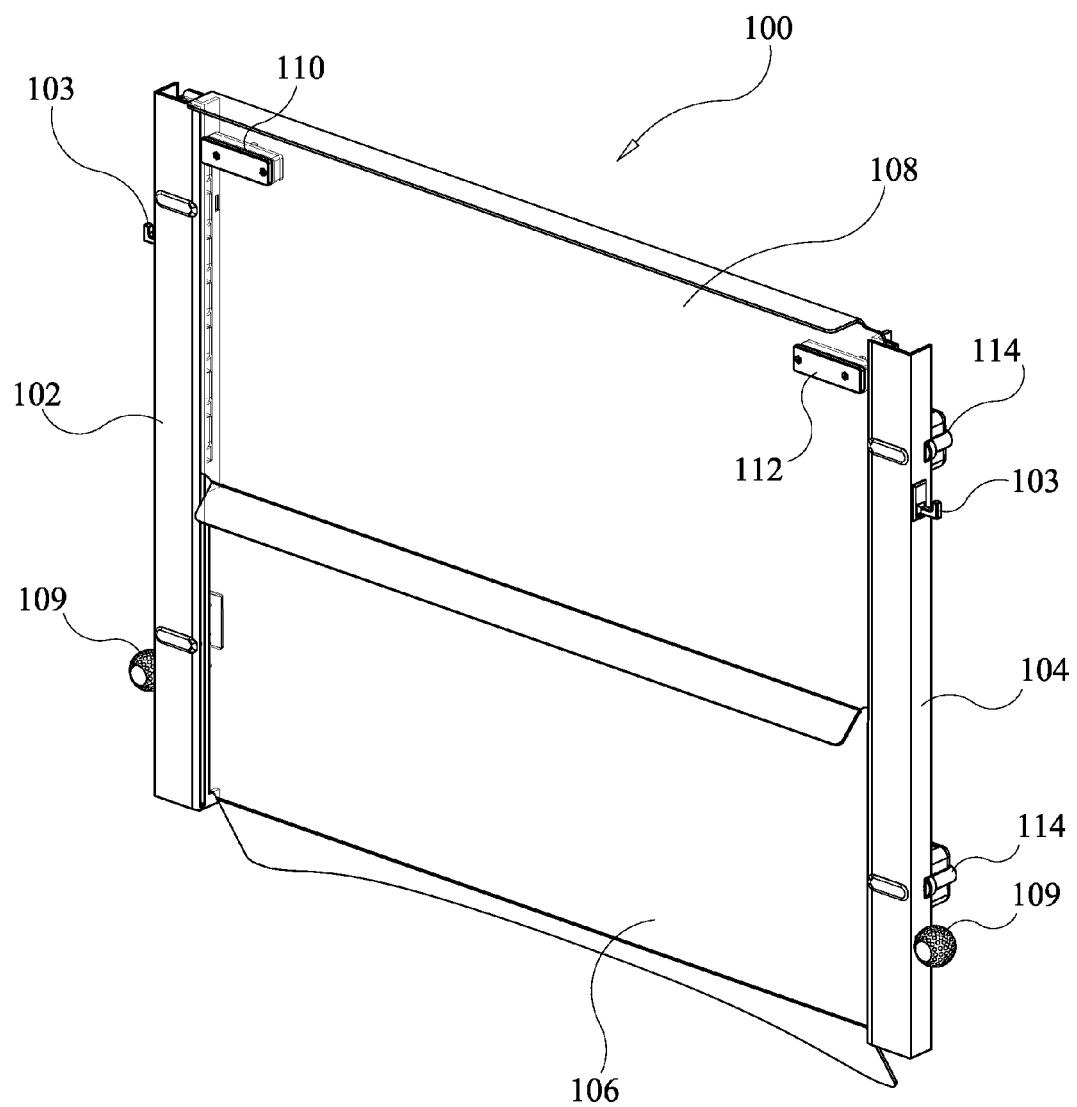
FIG. 1 is a perspective front view of a particular embodiment of a universal golf cart windshield assembly.

Referring to FIG. 1, a particular illustrative embodiment of a universal golf cart windshield assembly is disclosed and generally designated 100. The windshield assembly 100 includes a first elongated rail 102 and a second elongated rail 104. A lower windshield pane 106 and an upper windshield pane 108 are secured between the pair of elongated rails 102, 104. A first spring loaded latch 110 and a second spring loaded latch 112 are secured to the upper windshield pane 108. The respective free end of the spring loaded latches 110, 112 may be pulled to remove the opposing end of the latch from the respective elongated rail. When the latch is released, the latch springs back into the respective elongated rail. A hook 103 may be secured to an outer edge of the elongated rails 102, 104 by snapping a male portion of the hook 103 to a female portion on the elongated rails 102, 104. Another accessory that may be included on the elongated rails 102, 104 is a cigar holder 109 may be snapped to one or both of the elongated rails 102, 104 as illustrated in FIG. 1.

The first elongated rail 102 is configured to be secured to a first vertical support member 142 of a golf cart 140 and the second elongated rail 104 is configured to be secured to a second vertical support member 144 of the golf cart 140. Brackets 114 are used to secure the windshield assembly 100 to the golf cart 140.

The elongated rails 102, 104 may generally be square or any other shape, where the elongated rails 102, 104 are configured to fit adjacent to the vertical support member 142, 144 of the golf cart 140. The windshield panes 106, 108 are easily replaceable if damaged because they require no glue in contrast to prior art windshield assemblies.

Figure 2:
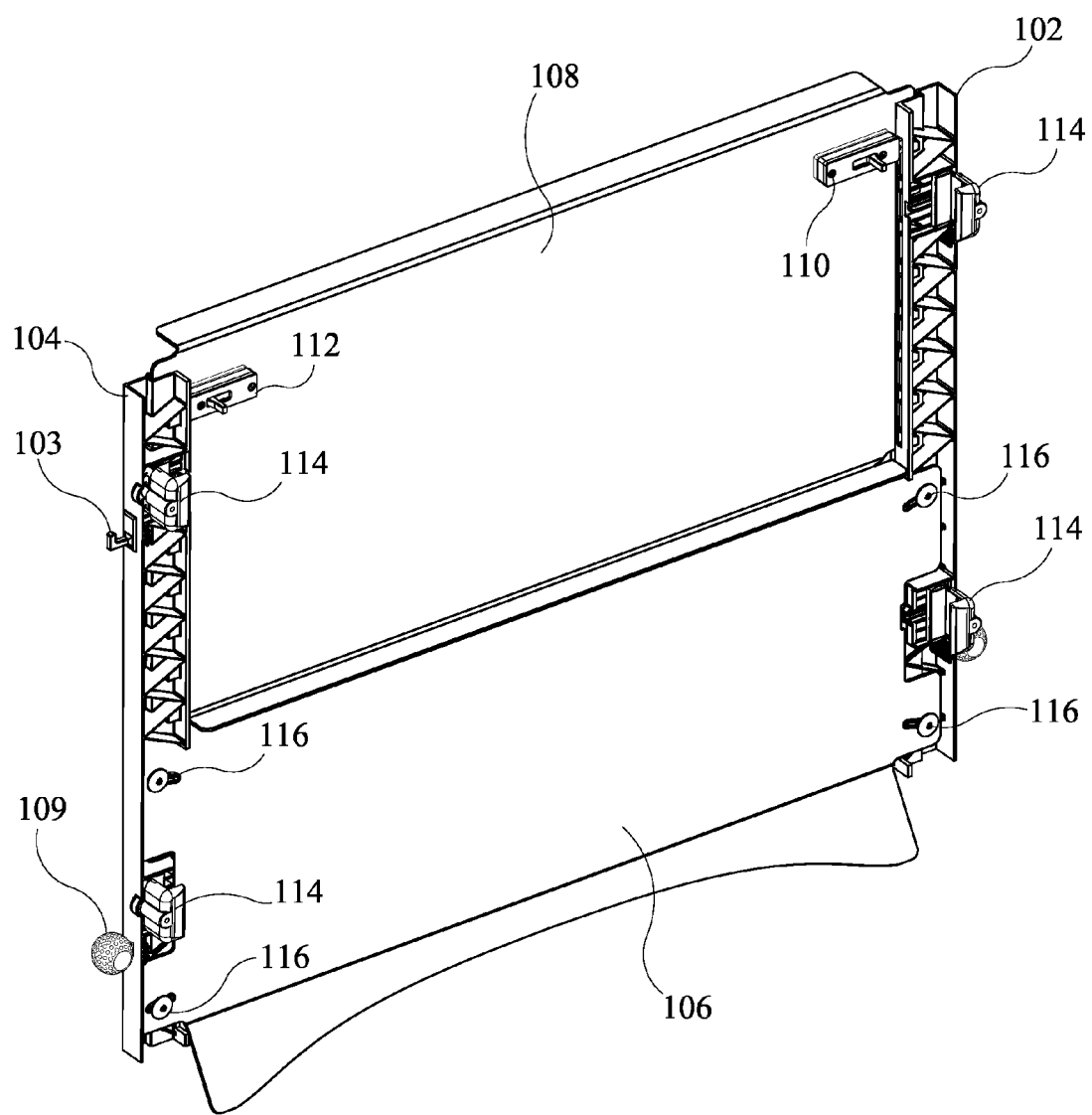
FIG. 2 is a perspective rear view of the universal golf cart windshield assembly of FIG. 1.

Referring now to FIG. 2, the rear side of the universal windshield assembly 100 is illustrated. The elongated rails 102, 104 are disposed on opposing sides and adapted to support the upper windshield pane 108 and the lower windshield pane 106. The spring loaded latches 110, 112 are secured to the upper windshield pane 108. A lower edge of the upper windshield pane 108 overlaps the lower windshield pane 106 when the upper windshield pane 108 is in the uppermost vertical position. This provides a complete barrier that protects the driver and passenger of the golf cart from the weather such as wind and rain, for example. Existing typical golf cart windshields include two panes that are hinged together, which does not provide full protection from the elements through the gap between the panes in addition to not being vertically adjustable.

The lower windshield pane 106 is secured to the elongated rails using fastening means 116, which can include bolts, screws, or adhesive, for example. The lower windshield pane 106 may have horizontally disposed slots so that the lower windshield pane 106 can be secured between vertical support members 142, 144 of various golf carts that have varying dimensions.

The brackets 114 are used to removably secure the windshield assembly 100 to the golf cart 140. The brackets 114 may have a square, round or other shaped interior surface to fit around the vertical support members 142, 144. The brackets 114 slip over the vertical support members 142, 144 and then can be adjusted to clamp the windshield assembly 100 firmly in place.

Figure 3:
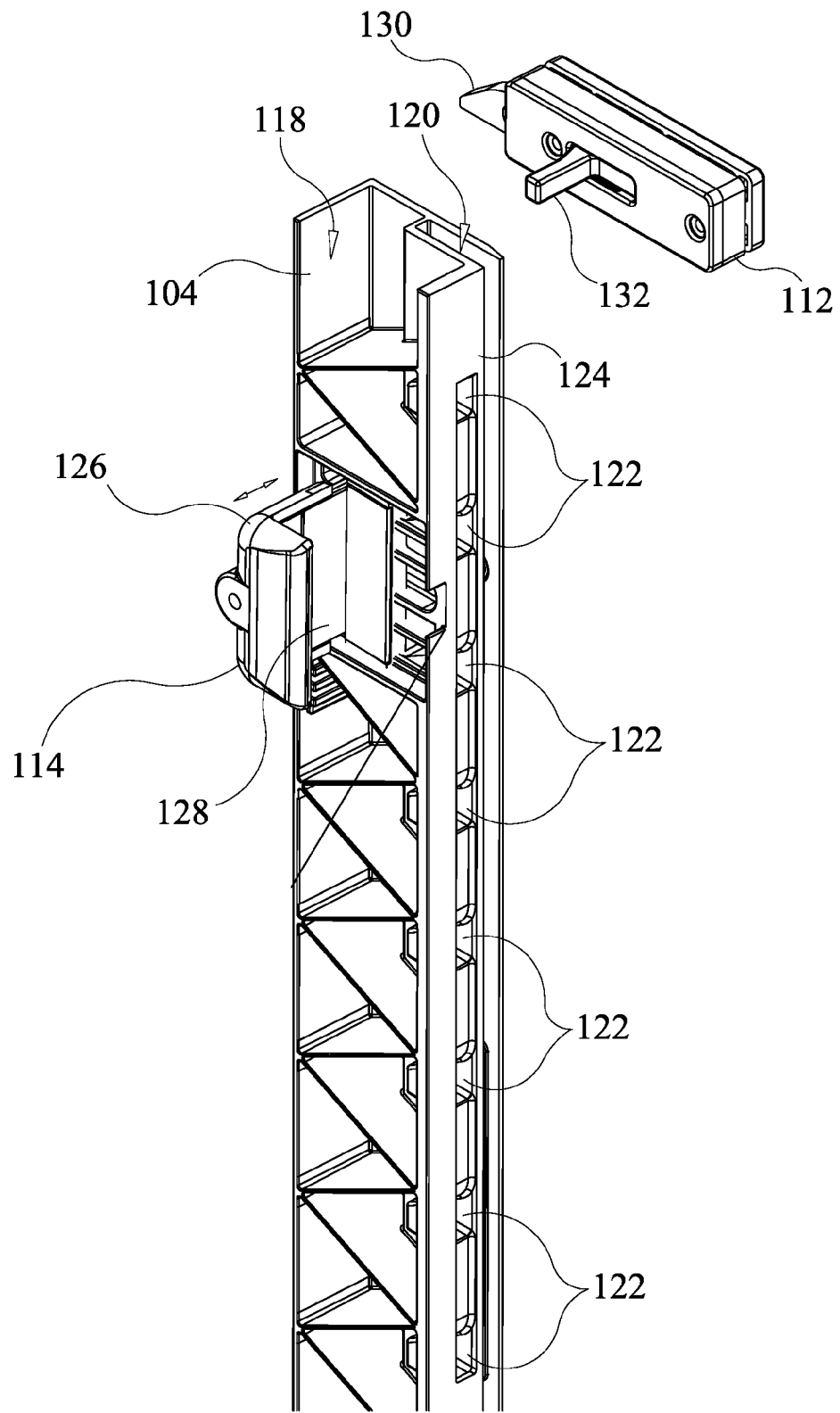
FIG. 3 is a partial rear perspective view of an elongated rail of the universal golf cart windshield assembly.

A partial view of the elongated rail 104 is shown in FIG. 3. The first and second elongated rails 102, 104 are mirror images of one another. A longitudinal slot 120 is disposed within each elongated rail 102, 104, where the longitudinal slot 120 is adapted to slidingly engage an edge of the upper windshield pane 108. The upper windshield pane 108 is adapted to slide within the longitudinal slot 122 and along the length of the longitudinal slot 122. The upper windshield pane 108 is adapted to overlap the lower windshield pane 106 by sliding within the longitudinal slot 122, where the longitudinal slot 122 is offset from the lower windshield pane 106. As described above, the upper windshield pane 108 and the lower windshield pane 106 are adapted to fit between the vertical support members 142, 144 of the golf cart 140.

The upper windshield pane 108 is restrained in the desired vertical position using the spring loaded latches 110, 112, which engage apertures 122 disposed on a flange 124 of the elongated rails 102, 104. The flange 124 is orientated generally perpendicular to the upper windshield pane 108. The spring loaded latches 110, 112 are reciprocally movable between a first engaged position and a second retracted position using a finger hold 132. The apertures 122 may have a triangular contour, for example, so that an end 130 of the spring loaded latch 112 can more easily find and seat into the desired aperture 122 as the upper windshield pane 108 is moved up or down. For example, the user can move the upper windshield pane 108 upwards from one aperture 122 to the next and the sloping upper edge of the aperture 122 will cause the end 130 of the spring loaded latch 112 to move inward and release. When the upper windshield pane 108 is moved downward, the shape of the aperture 122 will grab the end 130 of the spring loaded latch 112, and secure the upper windshield pane 108 at the desired vertical location. In addition, the apertures 122 along the flange 124 may be any number and any spacing desired to accommodate the vertically adjustable upper windshield pane 108.

Figure 4:
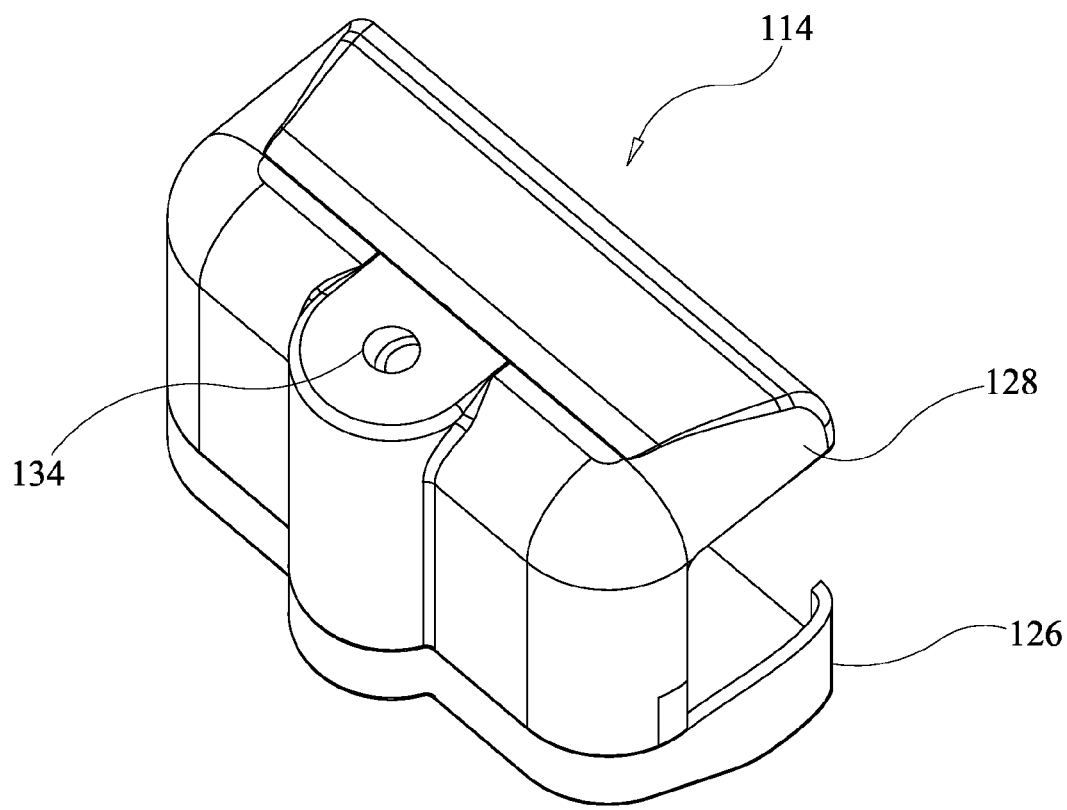
FIG. 4 is front perspective view of a bracket to secure the universal golf cart windshield assembly to a golf cart.

Referring now to FIG. 4, the brackets 114 each include an interlocking top half 126 and bottom half 128. A fastener (not shown) taken through an external boss 134 is used to secure the interlocking top half 126 and the bottom half 128 together in compression over the respective vertical support members 142, 144. The brackets 114 are adjustable in width as the interlocking top half 126 and the bottom half 128 are slidingly engaged with one another. The bottom half 128 of the bracket 114 may be secured independently to the respective elongated rail 104, or the same fastener used to secure the interlocking top half 126 and the bottom half 128 may be used to secure the bracket 114 to the elongated rail 104.

Figure 5:
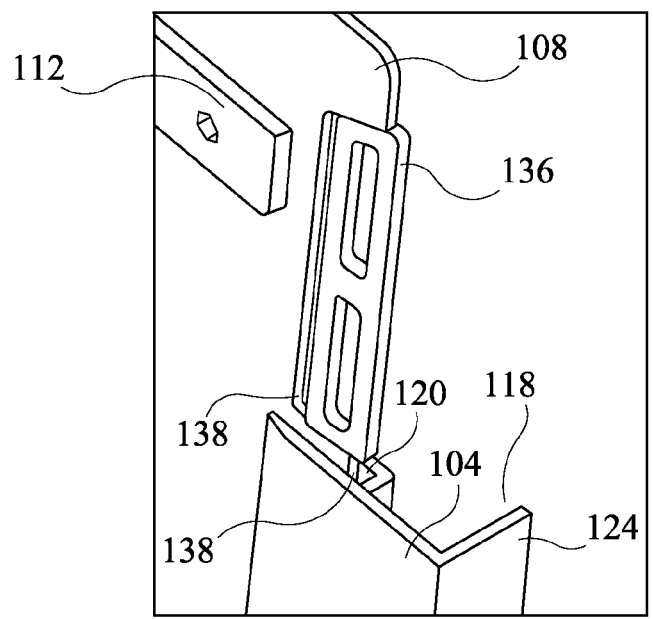
FIG. 5 is a partial perspective view of a windshield and elongated rail of the golf cart windshield assembly.

Referring now to FIG. 5, the longitudinal slot 120 is sized so that the upper windshield pane 108 has clearance to slide up and down therein. The longitudinal slot 120 provides lateral support while maintaining linear translation in the vertical direction. In addition, the longitudinal slot 120 allows for thermal expansion of the upper windshield pane 108 and can accommodate variations in manufacturing tolerances, which may cause out of parallel conditions. A spacer 136 is disposed within a void along an edge of the upper windshield pane 108 that prevents the upper windshield pane 108 from rattling in the slot 120 when the golf cart 140 is riding over bumpy terrain. The spacer 136 projects from the edge of the upper windshield pane 108 towards an inner edge of the longitudinal slot 120 to provide a friction fit between the upper windshield pane 108 and the longitudinal slot 120 to provide resistance against a fast fall of the windshield pane 108.

Figure 6:
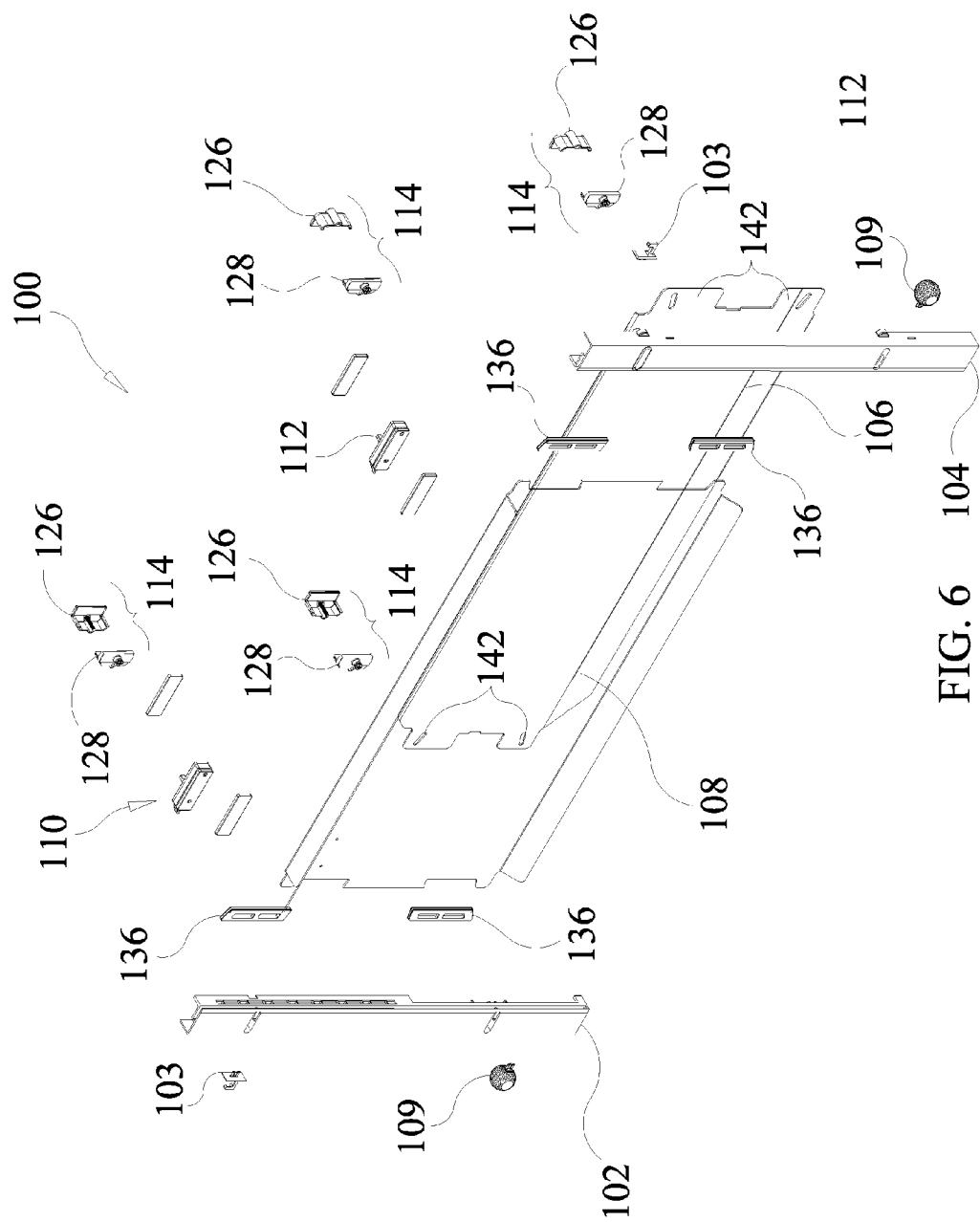
FIG. 6 is an exploded perspective view of the universal golf cart windshield assembly.

An exploded perspective view of the windshield assembly is shown in FIG. 6.

For example, the elongated rails 102, 104 are shown disposed on opposing sides of the lower windshield pane 106 and the upper windshield pane 108. The voids along the edges of the upper windshield pane 108 are configured to receive the respective spacers 136. The spacers 136 may be comprised of a resilient material. The spring loaded latches 110, 112 are secured proximate an upper edge of the upper windshield pane 108. The lower windshield pane 106 includes slots 142 that are used to pass fasteners 116 through to secure the lower windshield pane 106 to the elongated rails 102, 104. There are four brackets 114 shown in this particular illustrative embodiment. There are two brackets 112 disposed on each elongated rail 102, 104 to secure the windshield assembly 100 to the golf cart 140. In addition, each elongated rail 102, 104 has a hook 103 for hanging a towel or golf glove, for example, and a cigar holder 109.

Figure 7:
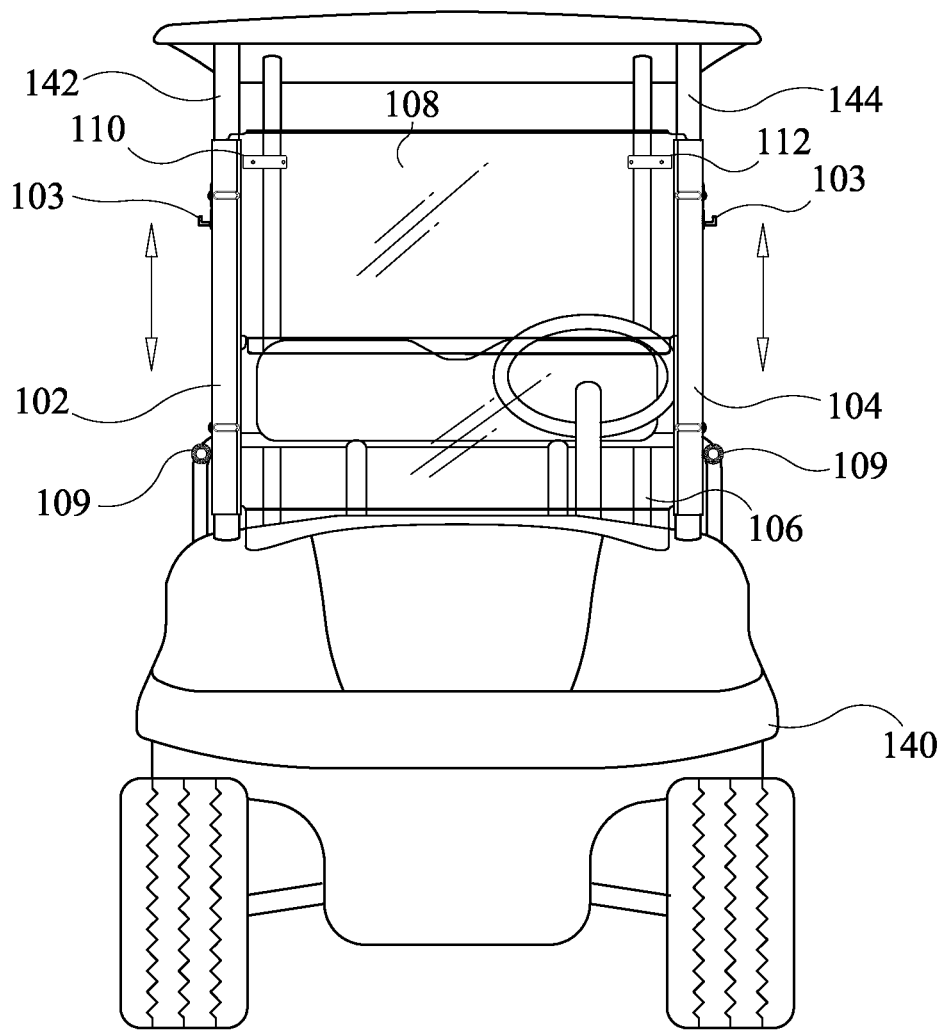
FIG. 7 is front view of the universal golf cart windshield assembly installed on the golf cart.

As best illustrated in FIG. 7, the universal golf cart windshield assembly 100 is installed in the golf cart 140. The elongated rails 102, 104 are secured to the vertical support members 142, 144 of the golf cart 140. The vertical support members 142, 144 of the golf cart 140 may be rectangular tubing, for example, so that the elongated rails 102, 104 are adapted to fit generally flush against the vertical support members 142, 144. In an alternative embodiment, the support members 142, 144 are round posts, for example, and the elongated rails 102, 104 may be reciprocally round shaped to engage the round vertical support members 142, 144.

The overlap between the upper windshield pane 108 and lower windshield pane 106 is clearly visible. The upper windshield pane 108 is restrained in the desired vertical position using the spring loaded latches 110, 112, which engage apertures 122 disposed on a flange 124 of the elongate rails 102, 104. As explained above, the spring loaded latches 110, 112 are reciprocally movable between a first engaged position and a second refracted position. The apertures 122 are configured so that the latches can easily find and seat into the desired aperture 122. The user can allow the windshield pane 108 to slide down from one aperture 122 to the next and the shape of the aperture 122 and the end 130 of the spring loaded latches 110, 112 will grab the respective pin 130 and secure the windshield pane 108.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features.

What is claimed is:

1. A universal golf cart windshield assembly, the assembly comprising:
   a pair of elongated rails;
   a C-shaped bracket secured to each rail, wherein the C-shaped bracket is configured to clamp over a vertical support member of a golf cart;
   a longitudinal slot is disposed on each rail;
   a flange is joined along a longitudinal edge of the longitudinal slot and extends generally at a right angle to the slot; and
   at least one aperture is disposed on the flange of each rail.

2. The universal golf cart windshield assembly of claim 1, the C-shaped bracket further comprising a protrusion about which the C-shaped bracket can rotate relative to the respective rail to adjust to an angle of the vertical support member of the golf cart.

3. The universal golf cart windshield assembly of claim 2, the C-shaped bracket further comprising an interlocking top and bottom half to adjust to a desired width of the vertical support member of the golf cart.

4. The universal golf cart windshield assembly of claim 3, further comprising an upper windshield pane, wherein opposing edges of the upper windshield pane are slidingly engaged with the respective longitudinal slot of each rail.

5. The universal golf cart windshield assembly of claim 4, further comprising a pin secured to the upper windshield pane and configured to engage the at least one aperture of the flange to restrain the upper windshield pane in a desired vertical position.

6. The universal golf cart windshield assembly of claim 5, further comprising at least one bolt adapted to secure the respective bracket to the respective rail.

7. The universal golf cart windshield assembly of claim 6, further comprising a lower windshield pane secured to the pair of rails, wherein the upper windshield pane is configured to overlap the lower windshield pane by sliding within the longitudinal slot.

8. The universal golf cart windshield assembly of claim 7, wherein the C-shaped bracket is configured to receive rectangular shaped vertical support members of the golf cart.

9. The universal golf cart windshield assembly of claim 8, wherein the spring loaded latch is reciprocally movable within a tubular housing between a first position and a second position.

10. The universal golf cart windshield assembly of claim 2, wherein the flange further comprising a plurality of apertures disposed along its length used to adjust the desired vertical position of the upper windshield pane.

\* \* \* \* \*